United States Patent [19]
Deichmann

[11] Patent Number: 5,179,968
[45] Date of Patent: Jan. 19, 1993

[54] CLIMATIC HEAT AIRCRAFT PROTECTIVE SCREEN

[75] Inventor: Richard E. Deichmann, Milford, Conn.

[73] Assignee: United Technologies Corporation, Hartford, Conn.

[21] Appl. No.: 614,774

[22] Filed: Nov. 16, 1990

[51] Int. Cl.$^5$ .................................... E04H 15/06
[52] U.S. Cl. .................. 135/88; 244/17.11; 244/1 R
[58] Field of Search ............ 135/88; 244/17.11, 139, 244/1 R; 150/154, 157, 166

[56] References Cited

U.S. PATENT DOCUMENTS

| | | | |
|---|---|---|---|
| 2,072,600 | 3/1937 | Lewis et al. | 244/139 |
| 2,392,448 | 1/1946 | Atherton | 244/139 |
| 2,609,164 | 9/1952 | Dillon | 150/157 |
| 3,044,516 | 7/1962 | Stoll | 150/166 |
| 3,057,580 | 10/1962 | Hahn | 150/166 X |
| 3,138,348 | 6/1964 | Stahmer | 244/139 X |
| 4,598,883 | 7/1986 | Suter | 150/166 X |
| 4,613,096 | 9/1986 | Pugh | 244/17.11 X |
| 4,763,783 | 8/1988 | Talbot | 150/166 X |

FOREIGN PATENT DOCUMENTS

| | | | |
|---|---|---|---|
| 1246042 | 12/1988 | Canada | 244/139 |
| 1097825 | 1/1961 | Fed. Rep. of Germany | 150/166 |

Primary Examiner—David A. Scherbel
Assistant Examiner—Lan Mai
Attorney, Agent, or Firm—Terrance J. Radke

[57] ABSTRACT

A climatic heat aircraft protective (CHAP) screen that has been designed to protect various types of aircraft, and especially helicopters, from the adverse effects of direct exposure to sunlight while being relatively insensitive to wind conditions. The CHAP screen is specifically designed for various aircraft types to facilitate easy and rapid deployment and removal of the CHAP screen utilizing only the flight crew of the aircraft. The CHAP screen includes a porous screen canopy having overhanging portions and flap portions that are operative to reflect direct sunlight while allowing air to pass therethrough. The CHAP screen also includes a containment bag affixed to the underside of the porous screen canopy that is used to compactly stow the porous screen canopy prior to deployment and to secure the CHAP screen to the rotor head assembly of a helicopter during deployment. Radial deployment strips formed from low-friction smooth material may be affixed to the underside of the porous screen canopy to facilitate deployment thereof overlying the main rotor blades of a helicopter. Tow ropes are attached to the ends of the radial deployment strips to facilitate deployment of the porous screen canopy and to secure the porous screen canopy in the deployed condition.

15 Claims, 10 Drawing Sheets fig. 1A fig. 1B fig. 3 fig.5 fig.6 fig. 7 fig.8A fig.8B fig.9A fig.9B

CLIMATIC HEAT AIRCRAFT PROTECTIVE SCREEN

TECHNICAL FIELD

This invention relates to environmental protection devices, and more particularly to a climatic heat protective screen for various types of aircraft including helicopters.

BACKGROUND OF THE INVENTION

Aircraft deployed in desert regions may be subjected to the adverse effects of prolonged exposure to direct sunlight such as excessive temperature buildups within the aircraft, particularly in the cockpit area. While most aircraft have been designed to operate in extreme temperature conditions, e.g., modern day helicopters have been designed to operate in temperature conditions exceeding 140° F., it is generally inadvisable to subject aircraft to extreme temperature conditions for prolonged periods of time. Prolonged exposure to high temperatures tends to degrade the avionics equipment of aircraft and/or to reduce the readiness response of the aircraft (while cooling systems are utilized to bring the avionics equipment within operating ranges). High temperatures also create a cockpit environment that is not conducive to maximum pilot efficiency and performance.

An obvious solution to the effects of excessive exposure to direct sunlight is to house aircraft in containment shelters that shield the aircraft from incident sunlight. While this solution is preferred, there are conditions that are not conducive to the use of containment shelters, either permanent or temporary. Aircraft may be deployed under rapid response conditions to underdeveloped desert locations where containment shelters are not readily available. In a similar manner, aircraft may be temporarily deployed to desert satellite locations for limited time durations which make erection of containment facilities non-cost effective.

It is known in the art to drape canvas covers over the rotor hub and rotor blades of helicopters to provide a shield which mitigates the adverse effects of direct sunlight on the helicopter fuselage. Such canvas covers are difficult to deploy, being bulky and weighty, and often require as many as ten personnel to lift, position, and secure the canvas cover in the proper position. Further, canvas material has a tendency to snag or catch on equipment discontinuities and/or obstructions in the rotor hub area or along the rotor blades, making deployment time consuming. And, canvas being a nonporous material, the stability of the canvas cover in the proper position may be adversely affected by wind conditions and/or propwash from adjacent helicopters or aircraft.

A need exists for an environmental protection apparatus that will shield aircraft, and particularly helicopters, from the adverse effects of direct sunlight. The environmental protection apparatus should be relatively insensitive to wind conditions such that the environmental protection apparatus remains stably deployed in wind conditions. The environmental protection apparatus should be relatively lightweight, compact, easy to handle, and easy to deploy. The environmental protection apparatus should also be quickly deployable utilizing only the flight crew of the aircraft.

SUMMARY OF THE INVENTION

It is therefore an object of the present invention to provide a climatic heat aircraft protective (CHAP) screen that mitigates the adverse effects of direct sunlight on an aircraft.

Another object of the present invention is to provide a CHAP screen that is relatively insensitive to wind conditions such that the CHAP screen remains stably deployed in wind conditions.

Yet another object of the present invention is to provide a CHAP screen that may be easily handled and deployed utilizing only the flight crew of the aircraft.

Still another object of the present invention is to provide a CHAP screen that is lightweight and stowable in a compact configuration.

The climatic heat aircraft protective (CHAP) screen according to the present invention is specifically designed for use in combination with a variety of aircraft, especially helicopters. The deployed CHAP screen effectively shields the main fuselage portion of helicopters and aircraft from direct sunlight, thereby mitigating the heating effects of direct sunlight. Moreover, the deployed CHAP screen has little contact with the aircraft fuselage such that air may pass over the aircraft fuselage, providing a measured degree of convective cooling for the aircraft fuselage. The CHAP screen of the present invention provides a significant reduction in internal ambient aircraft temperature as contrasted with the ambient temperature of an aircraft that is directly exposed to incident sunlight. Moreover, the porosity of the CHAP screen renders the CHAP screen relatively insensitive to wind conditions such that there is little problem maintaining the stability of the CHAP screen in the deployed condition under wind conditions. The design and packaging of the CHAP screen provides a compact kit that facilitates rapid deployment of the CHAP screen in a sequential manner in minimal time with minimal personnel.

The CHAP screen of the present invention includes a porous screen canopy, a containment bag attached to the underside of the porous screen canopy, and a plurality of radial deployment strips attached to the underside of porous screen canopy. The containment bag functions as a stowage container and also as a part of the CHAP canopy for the CHAP screen to provide a compact and easily handled kit prior to deployment. The containment bag includes means for securing the containment bag in the compact, stowed configuration, the same means being utilized to secure the containment bag to the helicopter rotor head assembly during deployment of the CHAP screen.

The CHAP screen is designed to include a number of radial deployment strips corresponding to the number of main rotor blades of the helicopter. Dual tow ropes are attached at the free end of each radial deployment strip and utilized in deploying the CHAP screen. The radial deployment strips are fabricated from a smooth, lightweight, low-friction material to facilitate the deployment procedure.

The porous screen canopy has a spoke configuration, corresponding to the number of radial deployment strips, and further includes overhanging portions that extend between adjacent radial deployment strips, and flap portions that are integral with corresponding overhanging portions and which extend downwardly between adjacent rotor blades. The porous screen canopy is fabricated as a screen from synthetic fibers which are resistant to sunlight and which will reflect incident sunlight. The porous screen canopy is fabricated in such manner that it will reflect about 50% of the incident sunlight. The porosity of the porous screen canopy permits air to flow through the porous screen canopy such that the CHAP screen is relatively stable in the deployed condition in wind conditions.

Deployment of the CHAP screen may be readily accomplished by utilizing two flight crewmembers of the aircraft. The compact, stowed CHAP screen is passed to one crewmember atop the helicopter where the containment bag is centered on the rotor hub area. The containment bag is opened by releasing the tie down velcro straps, the containment bag is spread over the rotor hub area, and the tie down velcro straps are utilized to secure the containment bag to the rotor blade assembly.

The porous screen canopy is deployed by dropping one set of tow ropes, positioned on opposite edges of the respective rotor blade, to the ground crewmember, who then utilizes the tow ropes to pull the segment of the porous screen canopy along the upper surface of the respective rotor blade. The radial deployment strip facilitates deployment by sliding smoothly along the upper surface of the respective rotor blade, and, in addition, facilitates passage of the porous screen canopy segment over equipment discontinuities and/or obstructions in the rotor hub area or along the rotor blade.

The foregoing procedure is repeated for the segment of the porous screen canopy corresponding to each rotor blade. The preferred method of deployment is to first deploy the segments of the porous screen canopy overlying the aft rotor blades and then to deploy the segments of the porous screen canopy overlying the forward rotor blades. Once the porous screen canopy has been deployed, the tow ropes are secured to aircraft tie down positions. The flap portions of the porous screen canopy may be secured using ropes attached to weights such as sand bags.

The foregoing and other features and advantages of the present invention will become more apparent from the following description and accompany drawings.

DETAILED DESCRIPTION OF PREFERRED EMBODIMENTS

A climatic heat aircraft protective (CHAP) screen according to the present invention is designed to protect various types of aircraft, especially helicopters, from the effects of direct exposure to the sun while being relatively insensitive to wind effects. The CHAP screen is specifically designed for various aircraft types to facilitate easy and rapid deployment and removal of the CHAP screen with a minimum number of personnel such as the flight crewmembers of the aircraft.

Figure 1A:
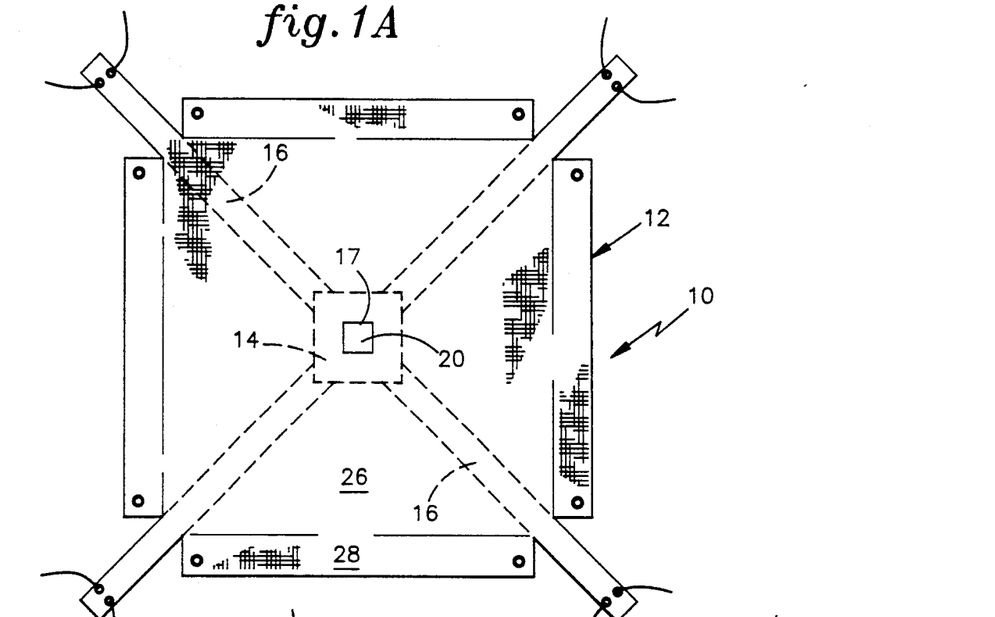
FIG. 1A is a top plan view of a horizontally deployed climatic heat aircraft protective (CHAP) screen according to the present invention.
Figure 1B:
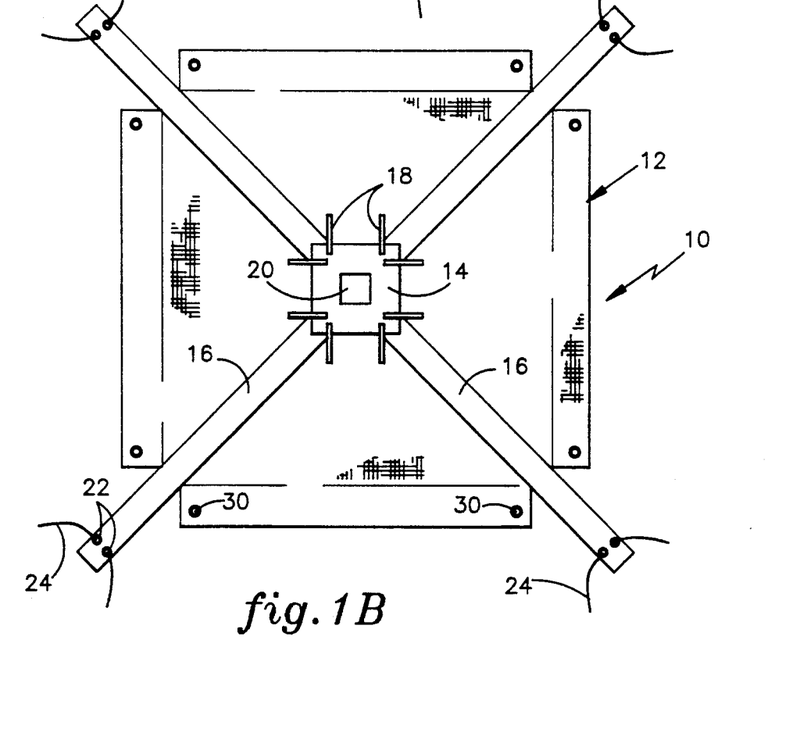
FIG. 1B is a bottom plan view of the horizontally deployed CHAP screen of FIG. 1A.
Figure 2:
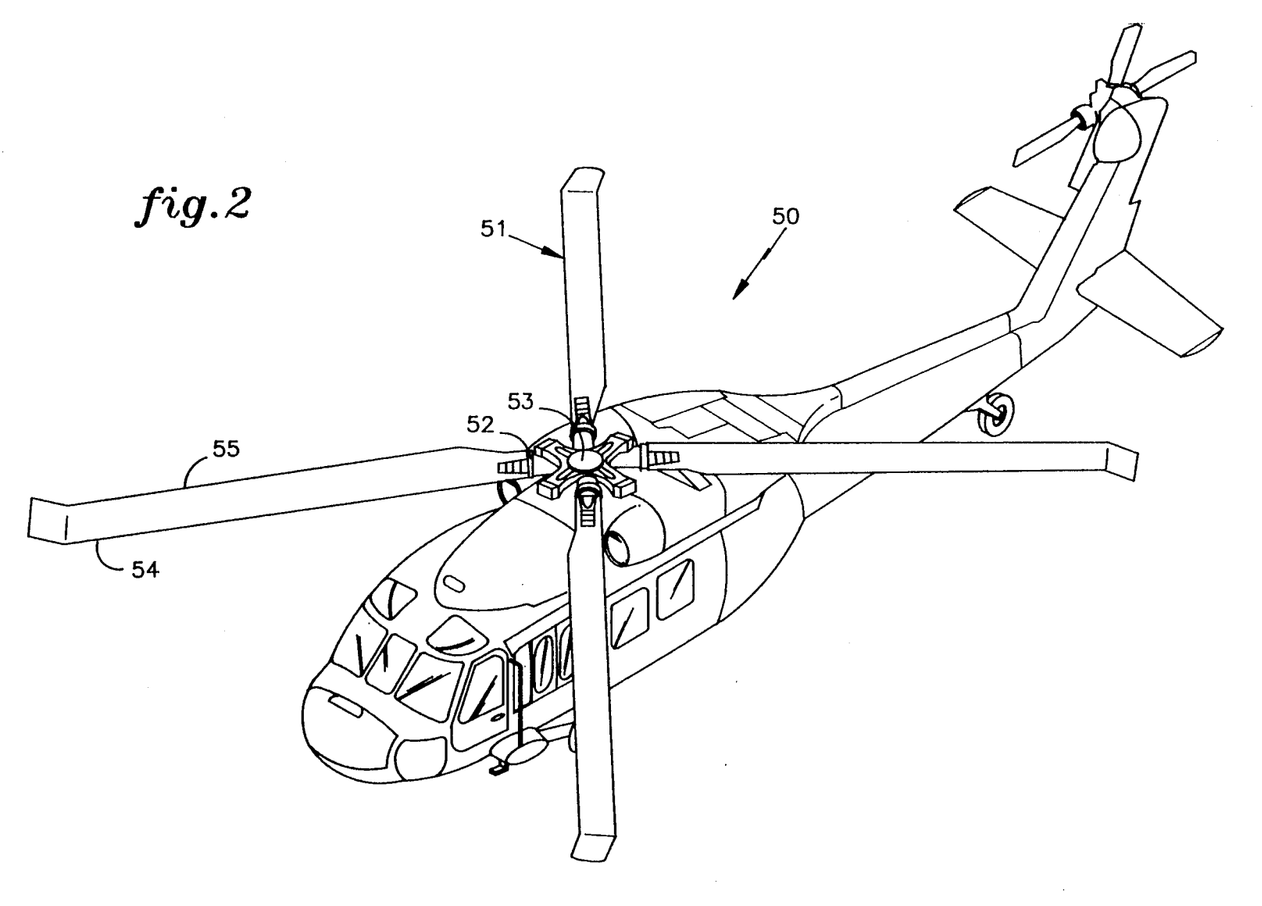
FIGS. 2-7 illustrate an exemplary deployment sequence for an embodiment of a CHAP screen designed for use in combination with a helicopter having four main rotor blades.

A better understanding of the features and utility of the CHAP screen 10 of the present invention can be had by reference to FIGS. 1A, 1B, and 2-7 and the following disclosure wherein like reference numerals designate corresponding or similar elements throughout the several views. FIGS. 1A, 1B illustrate an exemplary embodiment of a CHAP screen 10 (deployed in a horizontal plane for ease of explanation) designed for a helicopter having four main rotor blades such as the Black Hawk UH-60 or the Apache AH-64. FIGS. 2-7 illustrate one preferred procedure for installing the CHAP screen 10 on such a helicopter.

The basic elements of the CHAP screen 10 include a porous screen canopy 12, a containment bag 14, and a plurality of radial deployment strips 16. The containment bag 14 is formed from a durable, lightweight material such as nylon or vinyl, and, for helicopter variants of the CHAP screen, has a generally square configuration. The containment bag 14 is secured to the underside (side abutting the helicopter) of the porous screen canopy 12 as generally indicated by reference numeral 17 by conventional means such as stitching, complementary velcro strips, or high strength adhesives. Tie down velcro straps 18 are attached at each underside corner of the containment bag 14 as shown in FIG. 1B.

The containment bag 14 functions as a stowage container for the porous screen canopy 12 such that the CHAP screen 10 is compact and easily handled prior to deployment. The tie down velcro straps 18 are interlocked with one another to hold the containment bag 14 in a stowed, compact configuration prior to deployment, as more clearly seen in FIG. 3. During deployment, as discussed hereinbelow in further detail, the containment bag 14 lies flush with and generally covers the main rotor hub area of the helicopter. The containment bag 14 may also include a removable central velcro member 20. Some helicopters, such as the Apache AH-64, have a mast extending upwardly from the rotor hub, and removal of the central velcro member 20 allows the CHAP screen 10 to be installed down over the mast so that the containment bag 14 lies flush with the main rotor hub area (mast extends through the central velcro member 20).

The number of radial deployment strips 16 in the CHAP screen 10 corresponds to the number of main rotor blades of the helicopter, and for the embodiment illustrated equals four. The radial deployment strips 16 are formed from a lightweight, low-friction material such as nylon. The radial deployment strips 16 extend radially outwardly from the securement perimeter 17 of the porous screen canopy 12, and generally have a length such that the strips 16 may be deployed along substantially the entire length of corresponding rotor blades. Preferably, the radial deployment strips 16 have a width slightly greater than the maximum upper camber of the rotor blades to facilitate deployment of the porous screen canopy 12. The radial deployment strips 16 are secured to the underside of the porous screen canopy 12 by conventional means such as stitching or high strength adhesives.

A pair of grommets 22 are installed at the end of each radial deployment strip 16. A tow rope 24 is installed in each grommet 22. Each tow rope 24 has a length slightly greater than the maximum height of the rotor blades above the earth.

The porous screen canopy 12 has a spoke configuration (corresponding to the radial deployment strips 16) and further includes overhanging portions 26 that extend between adjacent rotor blades, i.e., between adjacent radial deployment strips 16, in substantially the same plane as the rotor blades, and flap portions 28 which extend downwardly between adjacent rotor blades. These features may be more clearly seen in FIG. 7 which shows the CHAP screen 10 in the deployed condition. Grommets 30 may be installed at the corners of the flap portions 28.

The porous screen canopy 12 is fabricated as a screen from synthetic fibers such as polyester which are resistant to sunlight, i.e., minimal degradation of physical properties due to prolonged exposure to sunlight, and which will reflect incident sunlight. The porous screen canopy 12 is fabricated in such manner that it is operative to reflect about 50% of the incident sunlight, thereby reducing the heating effects of direct sunlight on the aircraft sheltered by the CHAP screen 10. Concomitantly, the porosity of the porous screen canopy 12 makes the porous screen canopy 12 less susceptible to wind gusts or rotor downwash since air may pass through the interstices of the porous screen canopy 12 such that the CHAP screen 10 is relatively stable in the deployed condition.

Referring to the drawings, FIGS. 2-7 illustrate the deployment procedure for a CHAP screen 10 according to the present invention designed for a four bladed helicopter 50 such as the Black Hawk UH-60 or the Apache AH-64. The helicopter 50 exemplarily illustrated in FIG. 2 has four main rotor blades 51 having root ends 52 connected to a rotor hub 53. Each rotor blade 51 includes a leading edge 54 and a trailing edge 55, the distance along the upper surface of the blade 51 between the leading and trailing edges 54, 55 defining the camber of the blade 51.

Figure 3:
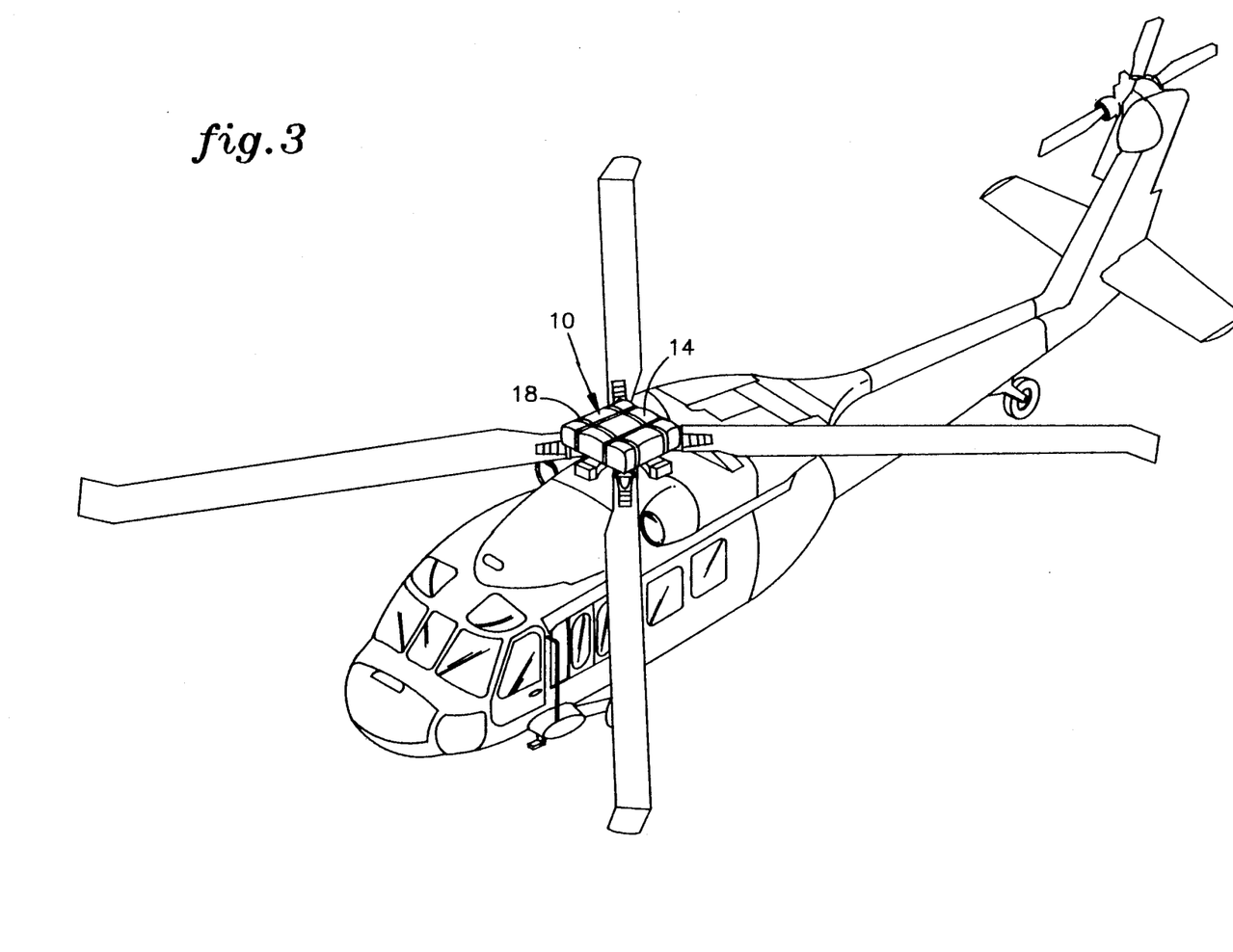

The deployment procedure may be readily accomplished utilizing a minimum of two personnel (helicopter crewmembers), although more personnel may be utilized to expedite the procedure. One crewmember is positioned atop the helicopter 50 and the other remains on the ground. The ground crewmember passes the CHAP screen 10, compactly stowed in the containment bag 14, to the other crewmember. The containment bag 14 is centered on the rotor hub 53 and positioned so that the tie down velcro straps 18 of the containment bag 14 are aligned on opposite sides of corresponding rotor blades 51 as illustrated in FIG. 3. (For helicopters having a mast extending upwardly from the rotor hub such as the Apache AH-64, the central velcro member 20 must be removed from the containment bag 14 and inserted down over the mast to position the containment bag 14 in the rotor hub 53 area.

Figure 4:
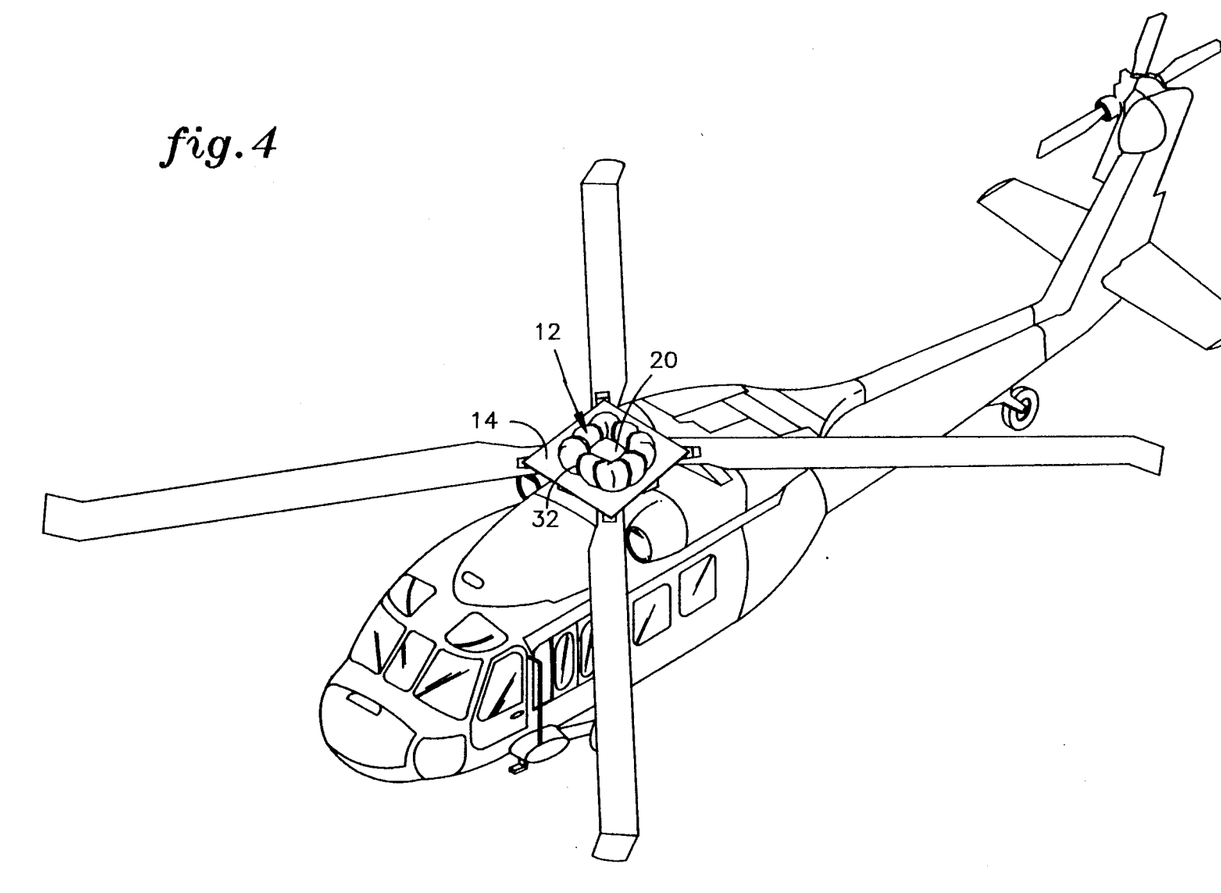
Figure 5:
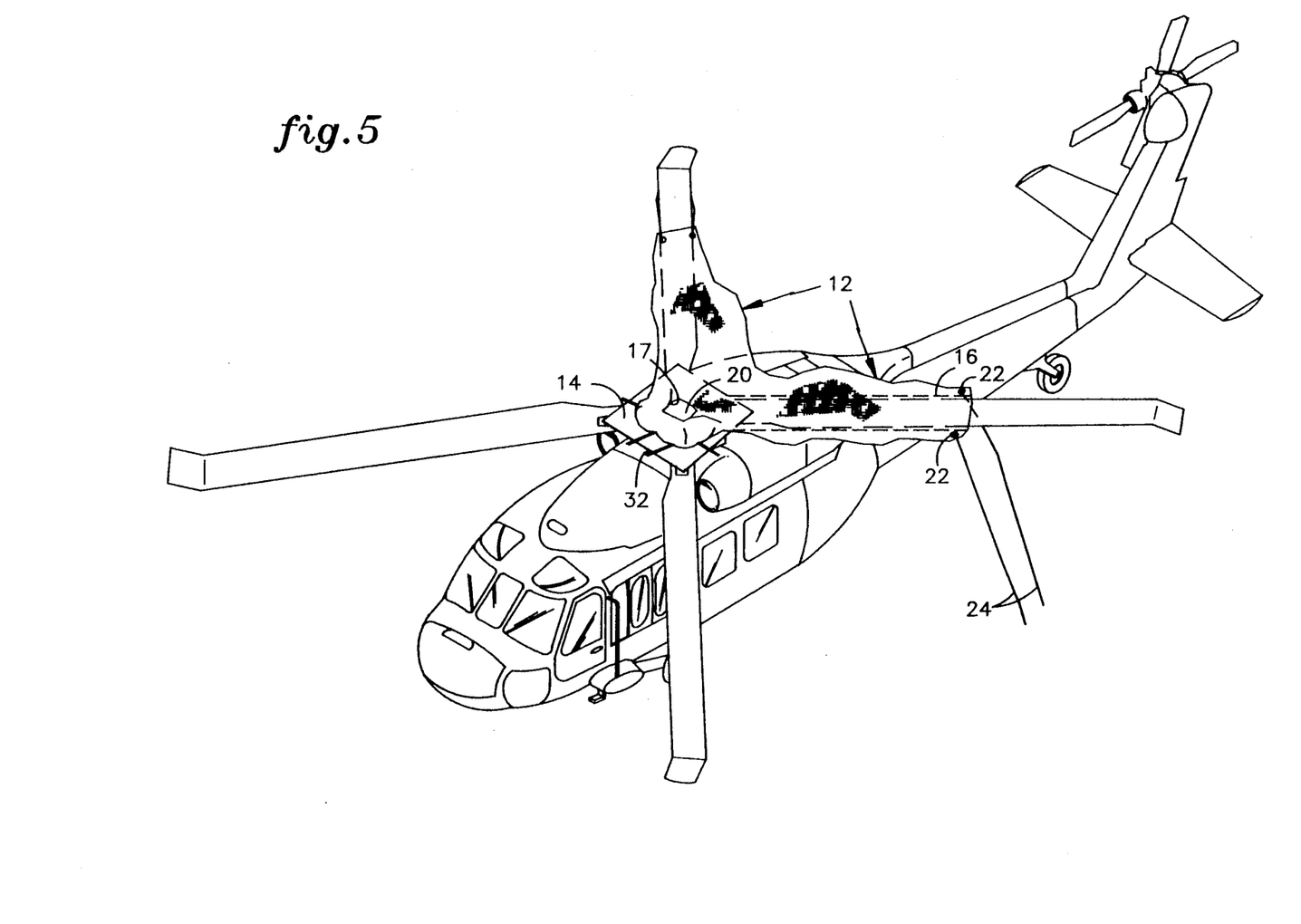

The tie down velcro straps 18 at each corner are unfastened, the containment bag 14 is spread out to cover the rotor hub 53 area, and the tie down velcro straps 18 at each corner are then refastened in combination with the root end 52 of the corresponding rotor blade 51. This procedure removably secures the containment bag 14 over the rotor hub 53 area as shown in FIG. 4. As further illustrated in FIG. 4, the porous screen canopy 12 is stored in a stowed configuration within the containment bag 14 by means of storage velcro straps 32.

The storage velcro straps 32 are unfastened to release the porous screen canopy 12. The tow ropes 24 for each radial deployment strip 16 are positioned outboard of the leading and trailing edges 54, 55, respectively, of the corresponding rotor blade 51 and passed to the ground crewmember as exemplarily illustrated in FIG. 5. The ground crewmember utilizes the tow ropes 24 to pull the respective segment of the porous screen canopy 12 outward towards the tip of the corresponding rotor blade 51.

The radial deployment strip 16 on the underside of the pulled segment of the porous screen canopy 12 facilitates the deployment of the porous screen canopy 12 by sliding smoothly along the upper surface of the corresponding rotor blade 51. In addition to reducing sliding friction, the smooth material forming the radial deployment strips 16 facilitates deployment of the porous screen canopy 12 over/past equipment discontinuities and/or obstructions that may exist in the rotor hub area or along the rotor blades.

Figure 6:
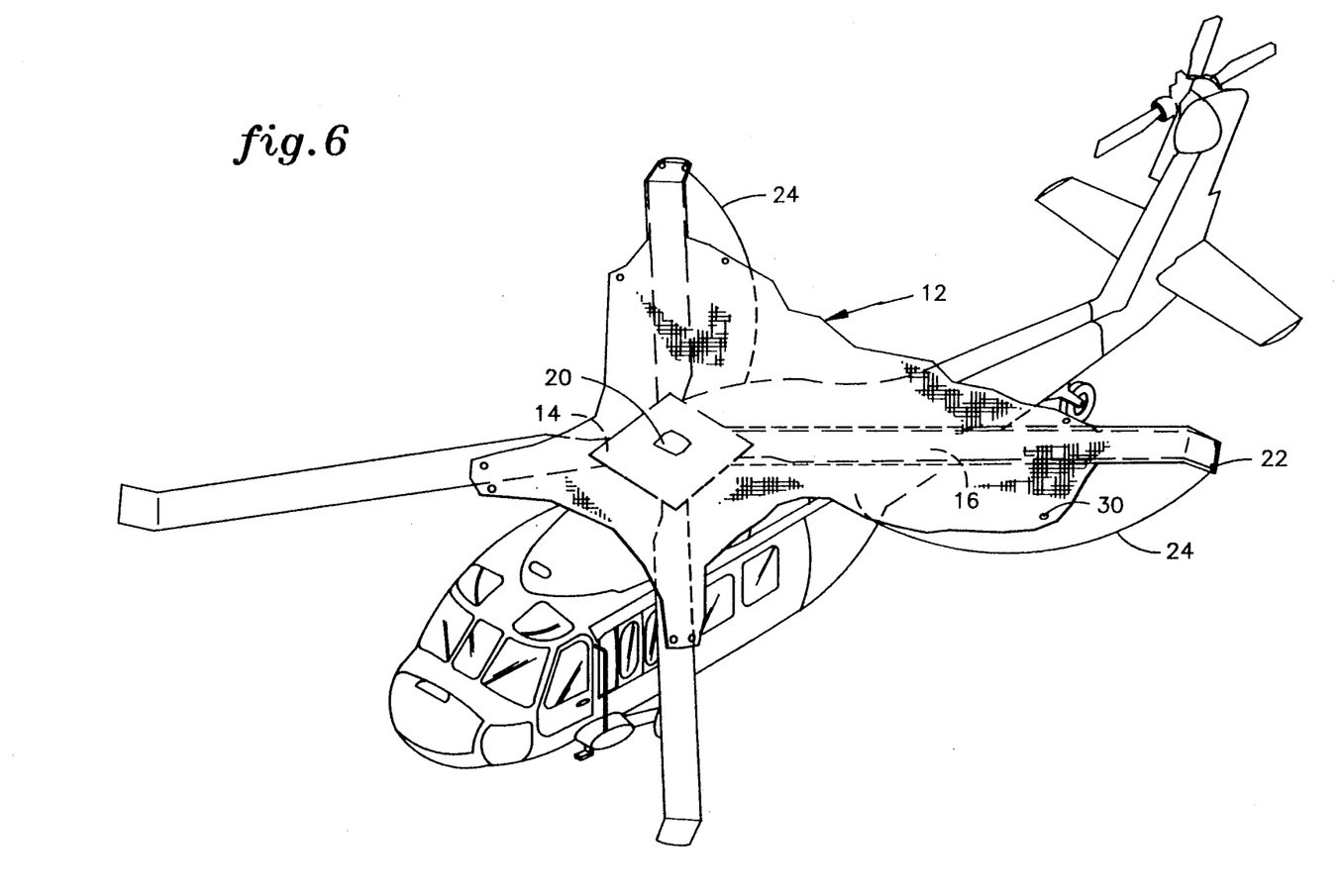

The above-described deployment procedure is repeated for each rotor blade 51. In the preferred deployment method, the segments of the porous screen canopy 12 that will overlie the aft rotor blades 51 are deployed first, as illustrated in FIG. 6, and then the segments of the porous screen canopy 12 that will overlie the forward rotor blades 51 are deployed. Once the porous screen canopy 12 has been completely deployed, as illustrated in FIG. 7, the tow ropes 24 are secured to aircraft tie down positions (not shown).

Depending upon wind conditions, the flap portions 28 of the porous screen canopy 12 may also be tied down to provide additional stabilization of the deployed CHAP screen 10 vis-a-vis the wind conditions. One end of ropes 34 are secured to respective grommets 30 of the flap portions 28 and the other end of the ropes 34 are secured to respective weights 36 such as sandbags which are packaged empty with the CHAPS kit.

Figure 7:
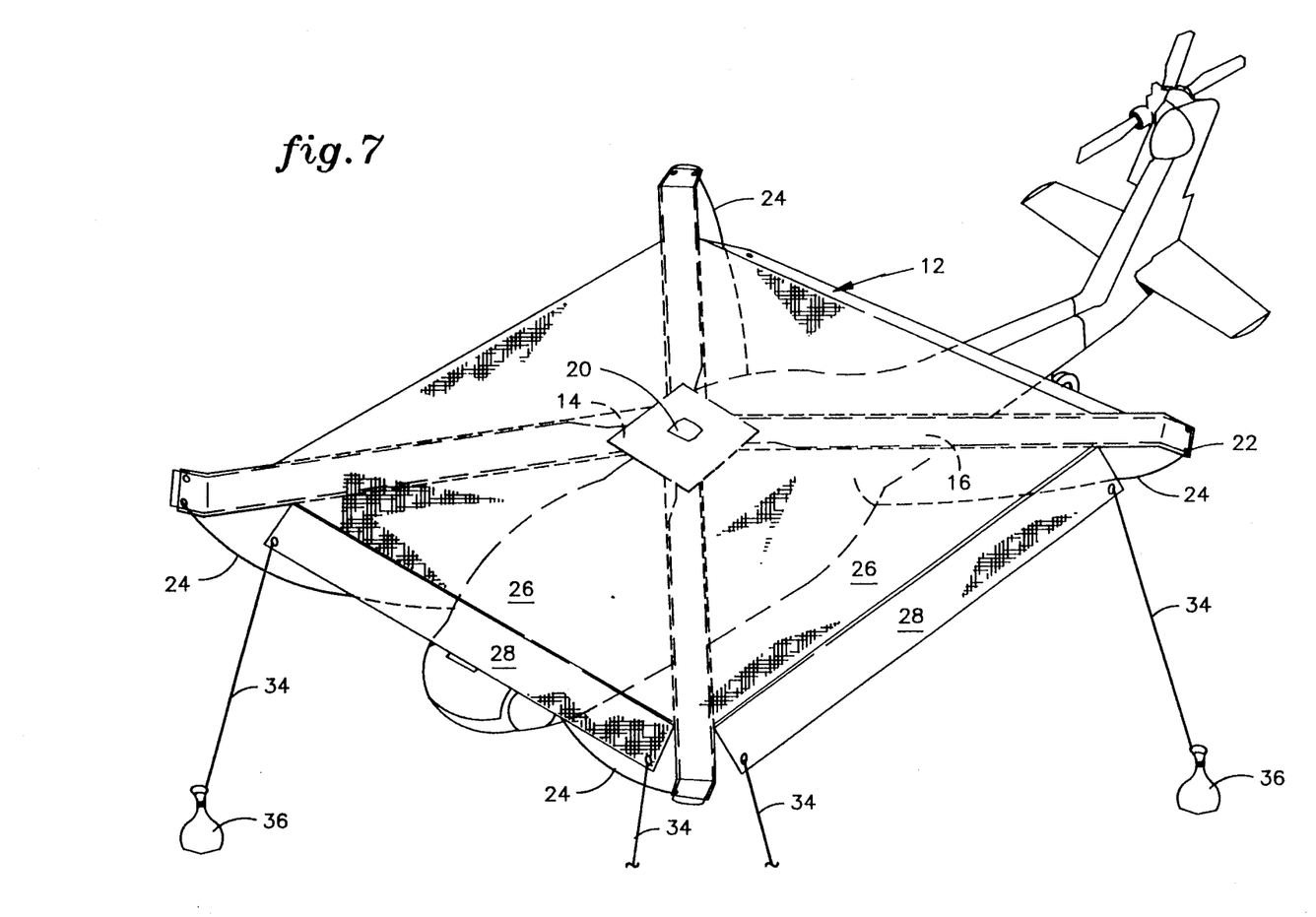

As illustrated in FIG. 7, the deployed screen canopy 12 effectively shields the main fuselage portion of the helicopter 50 from direct sunlight in the manner discussed hereinabove. Moreover, the CHAP screen 10 deployed as described hereinabove has little contact with the helicopter 50 fuselage (other than the containment bag 14 and possibly the radial deployment strips 16) such that air may pass over the helicopter 50 fuselage, providing a measured degree of convective cooling for the helicopter 50 fuselage. The CHAP screen 10 fabricated and deployed as described hereinabove provides a significant reduction in ambient helicopter temperature as contrasted with the ambient temperature of a helicopter that is directly exposed to incident sunlight. Moreover, the porosity of the porous screen canopy 12 as described hereinabove renders the CHAP screen 10 relatively insensitive to wind conditions such that there is little problem maintaining the stability of the CHAP screen 10 in the deployed condition.

The design and packaging of the CHAP screen 10 as described hereinabove provides a compact kit that facilitates rapid deployment of the CHAP screen 10 in a sequential manner in minimal time with minimal personnel. A trained flight crew (of two) can deploy the CHAP screen 10 in about 6 to 8 minutes.

To remove the CHAP screen 10 one crewmember is positioned atop the helicopter 50, under the CHAP screen 10, and the other on the ground. If the flap portions 28 of the porous screen canopy 12 have been tied down, the ropes 34 are released from the grommets 30 to release the flap portions 28. The tow ropes 24 are unfastened from the aircraft tie down positions. Starting with the forward rotor blades 51, the crewman atop the helicopter 50 pulls segments of the porous screen canopy 12, including tow ropes 24, to the center of the rotor head 53, with assistance from the ground crewman as required. Once the entire porous screen canopy 12 has been pulled into the center of the rotor head 53, it is folded and secured to the containment bag 14 by means of the storage velcro straps 32 (see FIG. 4).

Next the tie down velcro straps 18 are disengaged from corresponding root ends 52 of the rotor blades 51. The containment bag 14 is then folded about the porous screen canopy 12 and the tie down velcro straps 18 interlocked with one another to secure the CHAP screen 10 in its compact, stowed configuration. A trained flight crew can remove and stow the CHAP screen 10 in about 5 to 7 minutes.

The CHAP screen 10 according to the present invention may be colored to provide camouflage for the helicopter 50 in the deployed condition. The porous screen canopy 12, the containment bag 14 and the radial deployment strips 16 may be colored to match the desert environment, for example, the color of saudia sand. The colored CHAP screen 10 will provide a measured degree of concealment against detection by overflying aircraft and/or ground personnel. The CHAP screen 10 may also include a repair kit to facilitate repair of minor tears, etc., at the deployment site.

Figure 8A:
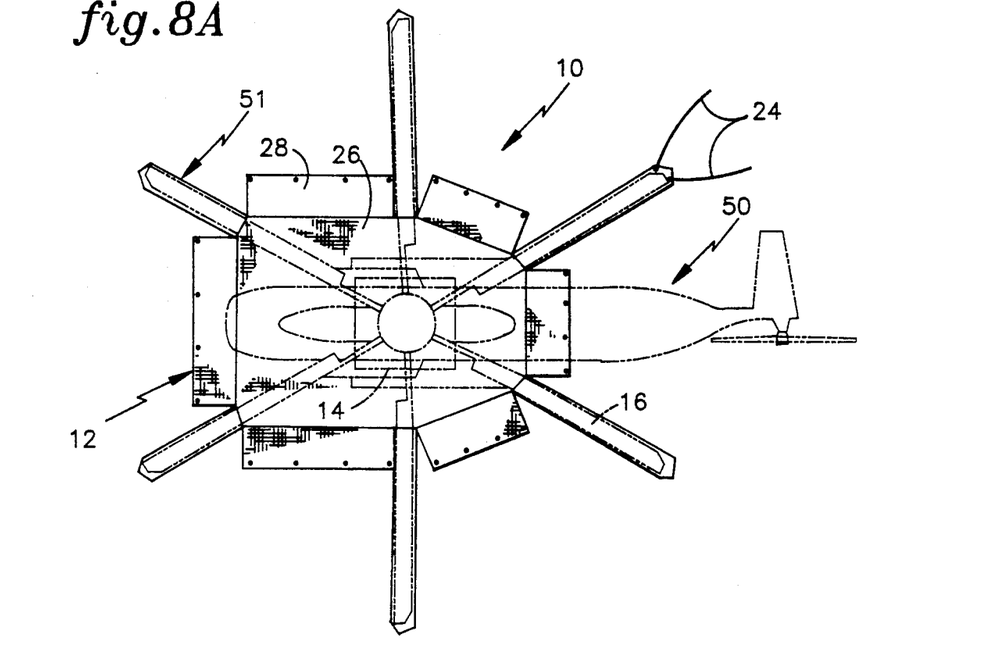
FIGS. 8A, 8B depict an embodiment of a CHAP screen for a helicopter having six main rotor blades.
Figure 8B:
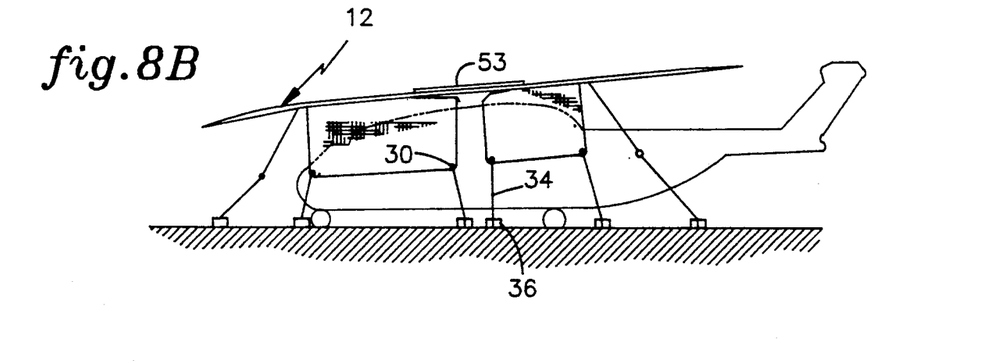

Other embodiments of CHAP screens 10 according to the present invention are exemplarily illustrated in FIGS. 8A, 8B, and FIG. 9. The CHAP screen 10 embodiment exemplarily illustrated in FIGS. 8A, 8B is designed for a helicopter 50 such as the CH-53 having six main rotor blades 51. While the CHAP screen 10 embodiment illustrated includes the features discussed hereinabove, there are some variations. Due to the positioning of the rotor head 53 in relation to the fuselage, the various overhanging portions 26 and flap portions 28, respectively, are not all of approximately equal surface area. As will be apparent by examining FIG. 8A, the forward overhanging portions 26 have a larger surface area than the aft overhanging portions 26. The different flap portions 28 have similar variations in surface area. The tie down velcro straps 18 are not attached at each corner of the containment bag 14, but rather are attached to the underside of the containment bag 14 in correspondence with the respective rotor blades 51 as illustrated in FIG. 8A.

Figure 9A:
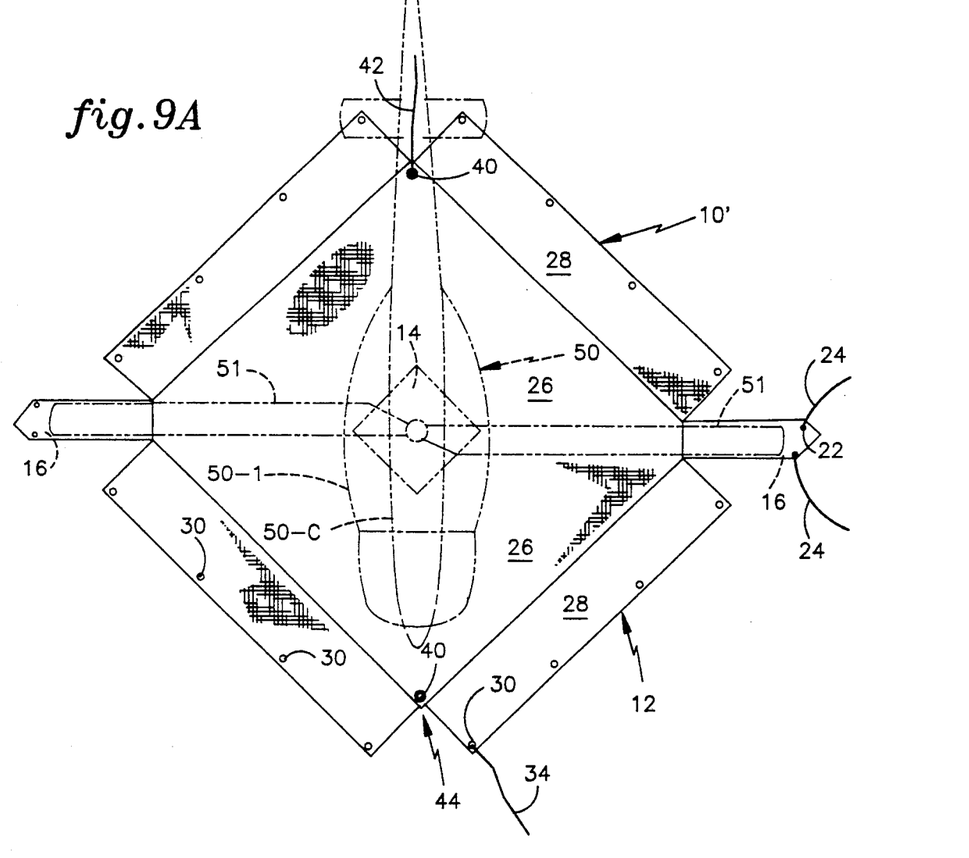
FIGS. 9A, 9B depict an embodiment of a CHAP screen for a helicopter having two main rotor blades.
Figure 9B:
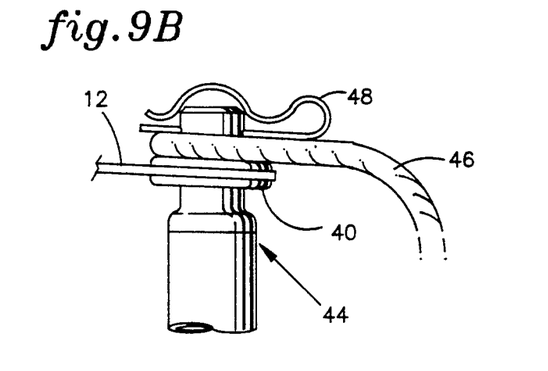

The CHAP screen 10' embodiment exemplarily illustrated in FIGS. 9A, 9B is designed for helicopters 50 such as the Cobra and the UH-1 having two main rotor blades 51. Referring to FIG. 9A, the profile of a Cobra-type helicopter is represented by reference numeral 50-C while the profile of a UH-1 helicopter is represented by reference numeral 50-1. While the CHAP screen 10' embodiment includes the features discussed hereinabove, there are variations and additional features based upon the fact that the helicopter 50 has only two main rotor blades 51. There are only two radial deployment strips 16, spaced 180° apart. Two overhanging portions 26 having a generally triangular shape extend outwardly (forward and aft) from the rotor blades 51 to apices that are aligned approximately with the centerline of the helicopter 50. Reinforced grommets 40 are disposed in the porous screen canopy 12 at each apex.

A rope 42 is disposed in combination with the aft reinforced grommet 40 and is used to secure the aft overhanging portion 26 of the porous screen canopy 12 to the tail pylon of the helicopter 50. A support pole 44, partially illustrated in FIG. 9B, having a guide rope 46 attached thereto, is utilized to support the forward overhanging portion 26 of the porous screen canopy 12. The support pole 44 is inserted through the reinforced grommet 40 and secured therewith by means of a removable pin 48. The support pole 44 is inserted in the earth, and the guide rope 46 tensioned to stabilize the support pole 44.

Due to the length of the flap portions 28, additional grommets 30 may be provided as illustrated in FIG. 9A. The tie down velcro straps 18 are attached to opposed corners of the containment bag 14 in correspondence with the rotor blades 51.

Figures 10A, 10B:
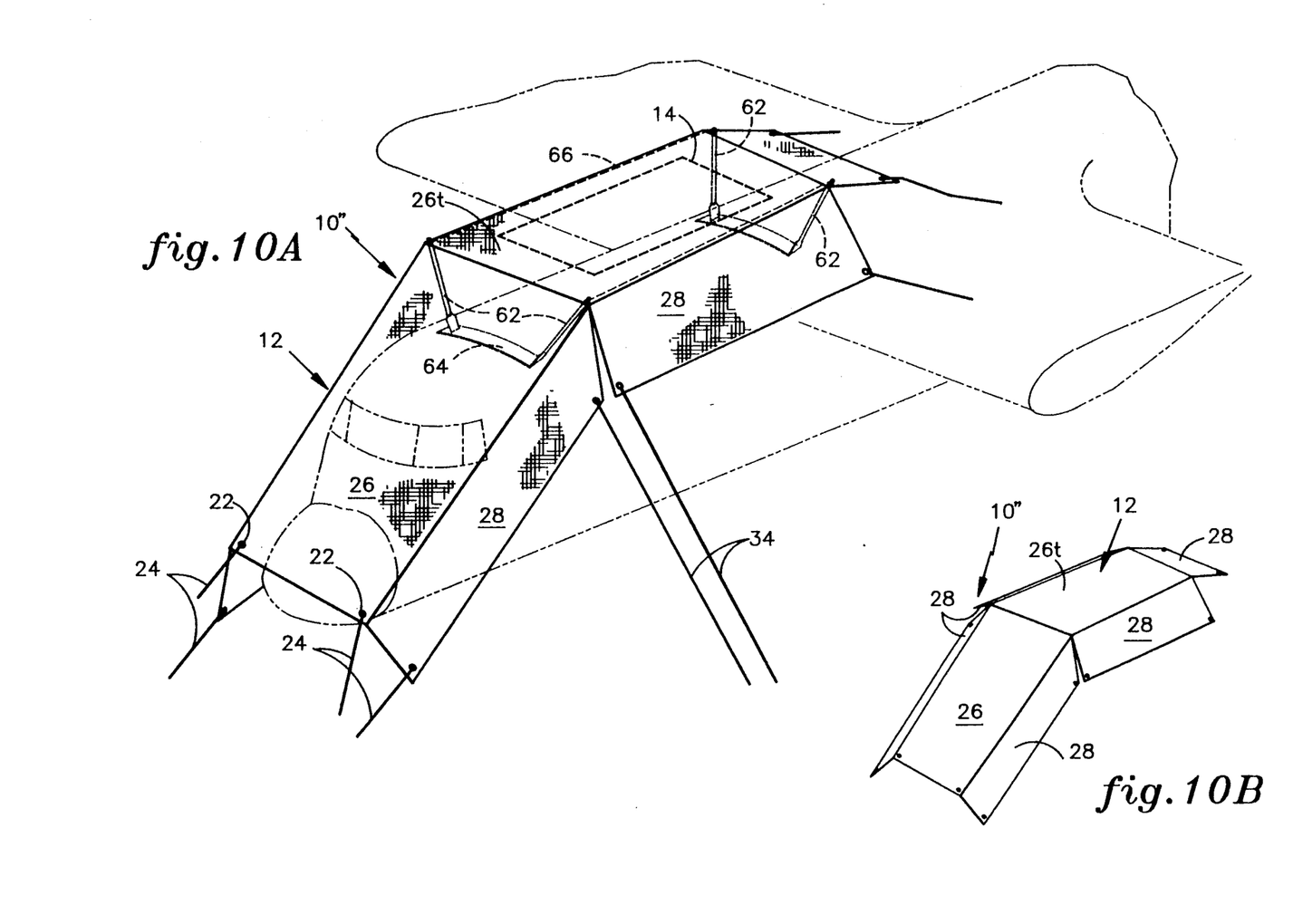
FIGS. 10A, 10B depict an embodiment of a CHAP screen for a C-130 aircraft.

The CHAP screen 10" embodiment exemparily illustrated in FIGS. 10A, 10B is designed for an aircraft such as a C-130. The CHAP screen 10" is configured superposition above the aircraft in the vicinity of the cockpit area. The porous screen canopy 12 includes rectangular overhang portions 26 and rectangular 28 flap portions. Telescoping poles 62, which open to a length of about six feet, are attached to the corners of the top overhang portion 26t as illustrated in FIG. 10A. Padded saddles 64 are attached to ends of adjacent telescoping poles 62. Reinforcement ropes 66 are sewn into the porous screen canopy 12 along the edges of the top overhang portion 26t.

A variety of modifications and variations of the present invention are possible in light of the above teachings. It is therefore to be understood that, within the scope of the appended claims, the present invention may be practiced otherwise than as specifically described hereinabove.

Although this invention has been shown and described with respect to detailed embodiments thereof, it will be understood by those skilled in the art that various changes in form and detail thereof may be made without departing from the spirit and scope of the claimed invention.

We claim:

1. A climatic heat aircraft protective screen for protecting a helicopter having a predetermined number of main rotor blades from direct sunlight, said protective screen being configured for ready and rapid deployment by a minimum number of personnel in minimum time, comprising:
   porous screen canopy means for shielding an aircraft from direct sunlight in a deployed condition, said porous screen canopy means having a configuration that is operative in the deployed condition to reflect sunlight therefrom, said configuration of said porous screen canopy being further operative to allow air to pass therethrough wherein said climatic heat aircraft protective screen is stable in the deployed condition to wind conditions;
   securing means attached to said porous screen canopy means for securing said porous screen canopy means in the deployed condition, said securing means including a plurality of radial deployment strips attached to said porous screen canopy means for facilitating deployment of said porous screen canopy means, said plurality of radial deployment strips corresponding in number and attachment orientation to the predetermined number of main rotor blades; and
   containment bag means integrally attached to said porous screen canopy means for storing said porous screen canopy means and said securing means in a compact configuration prior to deployment.

2. The climatic heat aircraft protective screen of claim 1 wherein each of said radial deployment strips includes a pair of tow ropes attached at an end thereof.

3. The climatic heat aircraft protective screen of claim 1 wherein said porous screen canopy means includes an overhanging portion between adjacent radial deployment strips and a flap portion depending integrally from said overhanging portion under the influence of gravity.

4. The climatic heat aircraft protective screen of claim 1 wherein said containment bag means includes tie down means for maintaining said maintaining said porous screen canopy means and said securing means in a compact configuration prior to deployment, said tie down means being further operative to secure said climatic heat aircraft protective screen to the rotor head assembly of the helicopter.

5. A climatic heat aircraft protective screen for protecting a helicopter from direct sunlight effects in a deployed condition, the helicopter including a rotor hub having a predetermined number of main rotor blades extending radially outwardly therefrom, comprising:
- a porous screen canopy that is operative in the deployed condition to shield the helicopter from the effects of direct sunlight, said porous screen canopy being fabricated from a material resistant to direct sunlight and operative to reflect direct sunlight therefrom, said porous screen canopy having a configuration that allows air to pass therethrough wherein said climatic heat aircraft protective screen is relatively insensitive to wind conditions;
- a plurality of radial deployment strips fabricated from a smooth, lightweight, low-friction material secured to the underside of said porous screen canopy, said plurality of radial deployment strips corresponding in number and orientation to the predetermined number of main rotor blades of the helicopter, said radial deployment strips being operative to slide smoothly along the upper surfaces of the corresponding main rotor blades to facilitate deployment of said porous screen canopy to the deployed condition; and
- a containment bag integrally secured to the underside of said porous screen canopy so as to lie flush with and generally cover the rotor hub during deployment of said porous screen canopy and said plurality of radial deployment strips, said containment bag functioning as a storage bag for said porous screen canopy and said plurality of radial deployment strips prior to deployment;
- said plurality of radial deployment strips extending radially outwardly from said containment bag.

6. The climatic heat aircraft protective screen of claim 5 wherein said configuration of said porous screen canopy is a screen that is operative to reflect about 50 percent of the direct sunlight incident thereon.

7. The climatic heat aircraft protective screen of claim 5 wherein said containment bag includes a plurality of tie down velcro straps, said tie down velcro strips being operative to interlock with one another to form said storage bag for stowing said porous screen canopy and said plurality of radial deployment strips prior to deployment, said tie down velcro straps being alternatively operative to fasten in combination with corresponding root ends of the main rotor blades to removably secure said containment bag to lie flush with and cover the rotor hub during deployment of said porous screen canopy and said plurality of radial deployment strips.

8. The climatic heat aircraft protective screen of claim 5 wherein each of said plurality of radial deployment s trips has a pair of tow ropes attached at the end thereof distal said containment bag, each said pair of tow ropes being positioned outboard of the leading and trailing edges of the corresponding main rotor blade during deployment and operative to pull said corresponding radial deployment strip to slide smoothly along the upper surface of the corresponding main rotor blade to facilitate deployment of said porous screen canopy to the deployed condition.

9. The climatic heat aircraft protective screen of claim 8 wherein said tow ropes are operative, with said porous screen canopy in the deployed condition, to secure said climatic heat aircraft protective screen to the helicopter.

10. The climatic heat aircraft protective screen of claim 5 wherein said porous screen canopy includes an overhanging portion extending between adjacent main rotor blades.

11. The climatic heat aircraft protective screen of claim 10 wherein said porous screen canopy includes a flap portion integrally extending from said corresponding overhanging portion under the influence of gravity.

12. The climatic heat aircraft protective screen of claim 11 wherein each said flap portion has at least two ropes secured thereto for tying said flap portion down in the deployed condition.

13. The climatic heat aircraft protective screen of claim 5 wherein said containment bag includes a removable central velcro member to facilitate installment of said climatic heat aircraft protective screen on helicopters having a central heat extending upwardly from the rotor hub.

14. The climatic heat aircraft protective screen of claim 5 wherein the helicopter has two main rotor blades, further comprising:
- two overhanging portions forming said porous screen canopy, said overhanging portions having a generally triangular shape extending outwardly to forward and aft apices, respectively;
- securing means disposed in combination with said aft apex of for securing said aft overhanging portion of said porous screen canopy to the tail pylon of the helicopter; and
- a support pole disposed in combination with said forward apex for supporting said forward overhanging portion of said porous screen canopy.

15. The climatic heat aircraft protective screen of claim 14 further comprising:
- first and second flap portions integrally extending from said forward and aft overhanging portions of said porous screen canopy, respectively, under the influence of gravity.

* * * * *

UNITED STATES PATENT AND TRADEMARK OFFICE
CERTIFICATE OF CORRECTION

PATENT NO. : 5,179,968

DATED : January 19, 1993

INVENTOR(S) : Richard E. Deichmann

It is certified that error appears in the above-identified patent and that said Letters Patent is hereby corrected as shown below:

Col. 9, Claim 4, line 12, delete "said maintaining";

Col. 10, Claim 8, line 10, change "s trips" to --strips--;

Col. 10, Claim 13, line 41, change "heat" to --mast--.

Signed and Sealed this

Thirtieth Day of November, 1993

Attest:

BRUCE LEHMAN

Attesting Officer

Commissioner of Patents and Trademarks